US009600661B2

(12) United States Patent
Safa

(10) Patent No.: US 9,600,661 B2
(45) Date of Patent: Mar. 21, 2017

(54) SYSTEM AND METHOD TO SECURE A COMPUTER SYSTEM BY SELECTIVE CONTROL OF WRITE ACCESS TO A DATA STORAGE MEDIUM

(75) Inventor: John Safa, Nottingham (GB)

(73) Assignee: Drive Sentry Limited, Berkshire (GB)

( * ) Notice: Subject to any disclaimer, the term of this patent is extended or adjusted under 35 U.S.C. 154(b) by 503 days.

(21) Appl. No.: 11/292,910

(22) Filed: Dec. 1, 2005

(65) Prior Publication Data

US 2007/0130433 A1   Jun. 7, 2007

(51) Int. Cl.
*G06F 12/00* (2006.01)
*G06F 21/52* (2013.01)

(52) U.S. Cl.
CPC .................................... *G06F 21/52* (2013.01)

(58) Field of Classification Search
CPC ................................. G06F 12/14; G06F 21/52
USPC ......................................................... 711/163
See application file for complete search history.

(56) References Cited

U.S. PATENT DOCUMENTS

| 5,825,877 | A | | 10/1998 | Dan et al. | |
|---|---|---|---|---|---|
| 5,974,549 | A | * | 10/1999 | Golan | 726/23 |
| 6,308,274 | B1 | | 10/2001 | Swift | |
| 6,922,781 | B1 | * | 7/2005 | Shuster | 713/165 |
| 6,941,470 | B1 | | 9/2005 | Jooste | |
| 6,978,366 | B1 | * | 12/2005 | Ignatchenko et al. | 713/166 |
| 7,681,237 | B1 | * | 3/2010 | Spiegel | 726/24 |

(Continued)

FOREIGN PATENT DOCUMENTS

| GB | 2402515 A | * | 12/2004 |
|---|---|---|---|
| JP | 08044630 A | | 2/1996 |

(Continued)

OTHER PUBLICATIONS

FileMerlin?. Conversion Library and API for Developers [online]. Advanced Computer Innovations, Inc., 2004 [retrieved on Jan. 28, 2008]. Retrieved from the Internet: <URL:http://web.archive.org/web/20040810113019/file-convert.com/fmdvref.htm>.*

(Continued)

*Primary Examiner* — Larry Mackall
(74) *Attorney, Agent, or Firm* — Ted Sabety; Sabety +associates, PLLC

(57) ABSTRACT

The present invention relates to a method and system of controlling the writing of data to a computer storage medium such as a hard drive in a computer system in order to prevent viruses or similar program code from being saved on such medium. Upon the computer system initiating a request to write data to the medium, the application embodying the method and system checks the identity of the running application requesting to perform the write. The method and system then checks a rule database to determine if such requesting application has permission to write to the medium. The system can also check that the data file type that the application seeks to write is a permitted type for that application. In response to the output of the database check, the requested write is allowed to proceed or is blocked. In the absence of a rule, the system presents the request to the computer user. The user can either grant permission or block, and such response can be included in the rule database. User responses can be collected from many instances of the invention and the collective response of users presented to a user.

58 Claims, 3 Drawing Sheets

(56) References Cited

U.S. PATENT DOCUMENTS

| | | | |
|---|---|---|---|
| 2001/0011323 A1* | 8/2001 | Ohta et al. | 711/112 |
| 2002/0073072 A1 | 6/2002 | Fukumoto | |
| 2002/0174102 A1* | 11/2002 | Kyler | 707/1 |
| 2003/0051169 A1* | 3/2003 | Sprigg et al. | 713/201 |
| 2003/0061504 A1* | 3/2003 | Sprigg et al. | 713/200 |
| 2003/0188231 A1* | 10/2003 | Cronce | 714/52 |
| 2004/0019807 A1* | 1/2004 | Freund | 713/201 |
| 2004/0168070 A1* | 8/2004 | Szor | 713/188 |
| 2005/0091501 A1* | 4/2005 | Osthoff et al. | 713/181 |
| 2006/0075492 A1* | 4/2006 | Golan et al. | 726/22 |

FOREIGN PATENT DOCUMENTS

| | | |
|---|---|---|
| KR | 200144706 A | 6/2001 |
| WO | WO 93/09498 | 5/1993 |
| WO | WO 98/50843 | 11/1998 |
| WO | WO 03/017682 A2 | 2/2003 |

OTHER PUBLICATIONS

Norton Internet Security 2000. Manual [online]. Symantec Corporation, 1999 [retrieved on Jan. 29, 2008]. Retrieved from the Internet: <URL:http://webpages.charter.net/cwind/nis.pdf>.*

Dekart. Dekart Private Disk SDK Makes Your Applications Stand Out from Competitors' Product with Strong Certified Encryption and Exclusive Access. [online], [retrieved on Oct. 18, 2012]. Retrieved from the Internet <URL: http://www.dekart.com/nc/news/news_archive/-848b91ff75/2005/august/>.*

Dekart. Dekart Private Disk 2.06—Protect your data, application by application!. [online], [retrieved on Oct. 18, 2012]. Retrieved from the Internet <URL: https://www.dekart.com/en/nc/news/news_archive/disk_encryption_firewall/2005/november/>.*

Peter Szor, The Art of Computer Virus Research and Defense, Section 11.12, Addison Wesley Professional, Feb. 3, 2005, New York, ISBN 0-321-30454-3.

* cited by examiner

SYSTEM AND METHOD TO SECURE A COMPUTER SYSTEM BY SELECTIVE CONTROL OF WRITE ACCESS TO A DATA STORAGE MEDIUM

BACKGROUND AND SUMMARY OF THE INVENTION

The present invention relates to a method of controlling the writing of data to a storage medium such as a hard drive in a computer system by an application running in a memory of the computer system.

The use of computers for Internet and other communication purposes, particularly in relation to electronic mail and the downloading of applications over the Internet has led to the proliferation of so-called computer viruses. Whilst anti-virus programs have been developed to combat these, they can be relatively elaborate and expensive and usually operate to deal with an offending virus only after the operating system of the computer has been infected. There are so many variants of virus programs being released that anti-virus programs cannot identify new viruses quickly enough.

The present invention seeks to provide an improved method of preventing the infection of a computer by a virus program.

According to the present invention there is provided a method of controlling write access to a storage medium by monitoring an application; detecting an attempt by the application to write data to said storage medium; interrogating a rules database in response to said detection; and controlling write access to the storage medium by the application in dependence on said interrogation.

DETAILED DESCRIPTION OF THE PREFERRED EMBODIMENTS

Preferably the interrogation comprises determining the write access allowed for the application and controlling the write access in dependence thereon.

Preferably write access is controlled to one of a plurality of levels, the levels including a first level in which no write access is allowed, a second level in which full write access is allowed, and a third level in which write access is only allowed for at least one specified file extension.

Preferably where write access is controlled to the first level, the method further includes generating a prompt on a display requesting response from a user.

Preferably the user can respond to the prompt by choosing from a number of possible responses, the possible responses including a first response for allowing write access, a second response for blocking write access and a third response for allowing write access to a specific file type only.

Preferably the user can respond further by selecting from a plurality of further actions, the further actions including, storing the chosen response in the rules database; and applying the chosen response only for the current attempt by the application to write data to said storage medium.

Figure 1:
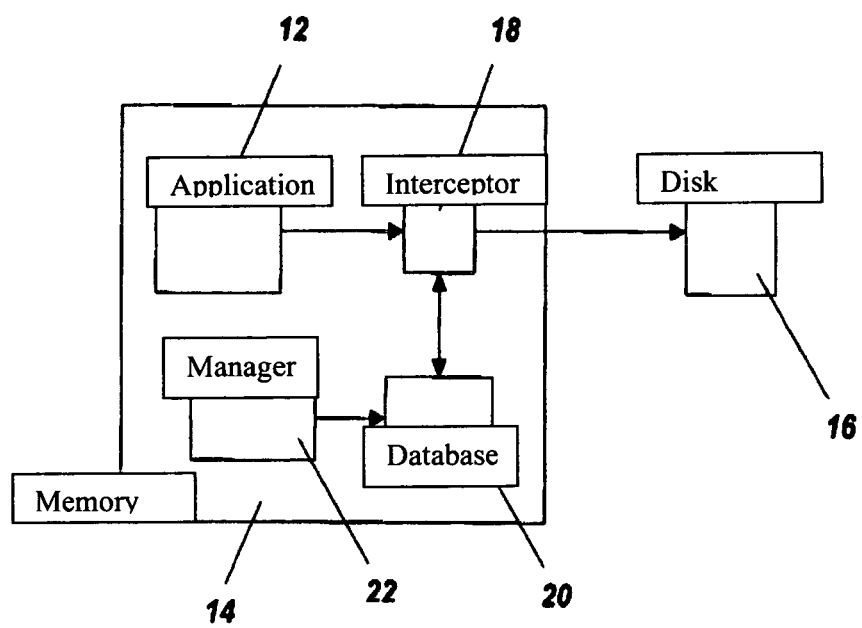
FIG. 1 is a process diagram showing the control of a write instruction of an application in accordance with a preferred method of the present invention.

Referring firstly to FIG. 1, this shows an application 12 which is running in a memory 14 of a computer system. The computer system also has a storage medium 16 which here is in the form of a hard drive or disc.

The typical computer is comprised of a central processing unit, a main memory, a mass storage device and input and output connections. The input and output include keyboards, monitors and network connections. The mass storage device can be a magnetic disk, optical disk or a large array of semiconductor devices. The main memory is typically an array of semiconductor circuits. The central processing unit is operatively connected to these components so that it can both control their activities and move data among the components. The central processing unit can load data off of the mass storage device and write it into main memory. This data can either be treated as a program or as data to be processed. If a program, the central processing unit passes control to the program data and executes the instructions encoded in the data. Program data can be an application servicing the user.

When the computer is first booted up it automatically loads an application 18 which is here termed as an "interceptor" program. This runs constantly in the background. As an alternative to being loaded on boot up of the computer, it can, of course, be run at the user's prompt at any time whilst the computer is operating. In addition, the interceptor program can run continuously in the background as a process, including as part of the computer operating system.

When the application 12 attempts to write data to the disc 16 the interceptor program 18 detects this and interrogates a rules database 20 to determine the authority of the application 12 to write to the hard drive 16. The database 20 is preferably encrypted and lists applications approved by the user with their level of write access. Practitioners of ordinary skill will recognize that the rule database is a set of entries or references in a data structure where the identity of an application is paired with one or more permission values, which encode the write access levels. A rule is therefore one or more permission values associated with an application. A rule can also include the signature of the application, which is used in embodiments where the application code is checked to be sure it has not been tampered with. A rule that is transmitted to a computer for updating the database will preferably include a reference to the application, which may be the name of the application, and the associated permission values for the permitted or denied write access levels, and may include the associated signature. The term data is used here in its general sense to include any form of data including programs. Although the invention is described in the preferred embodiment as applied to a hard disk, practitioners of ordinary skill will recognize that the application works equally well on any storage medium, including any mass storage device. The preferred number of possible write access levels for an application is three, being as follows:—

Level 0—this means that no write access to the hard drive 16 is allowed for the application 12.

Level 1—this means that full write access is allowed.

Level 2—the application is allowed write access to the hard drive 16 for specified file extensions only, (for example ".doc" file extensions for document files in Microsoft Office™) file extensions of data that can be written to the hard drive are also held in the database 20.

Level 4—The application can be granted to have access to a specific drive or directory. The database can contain corresponding references between applications and file types or file extensions that such application may write.

There are a number of rules which can be applied to the database 20 and these are controlled by a manager program 22 which can sit in the memory 14 alongside the interceptor program 18 and can also be run on start up of the computer or at any preferred time during operation of the interceptor program 18, running continuously in the background, including as part of the computer operating system.

Figure 2:
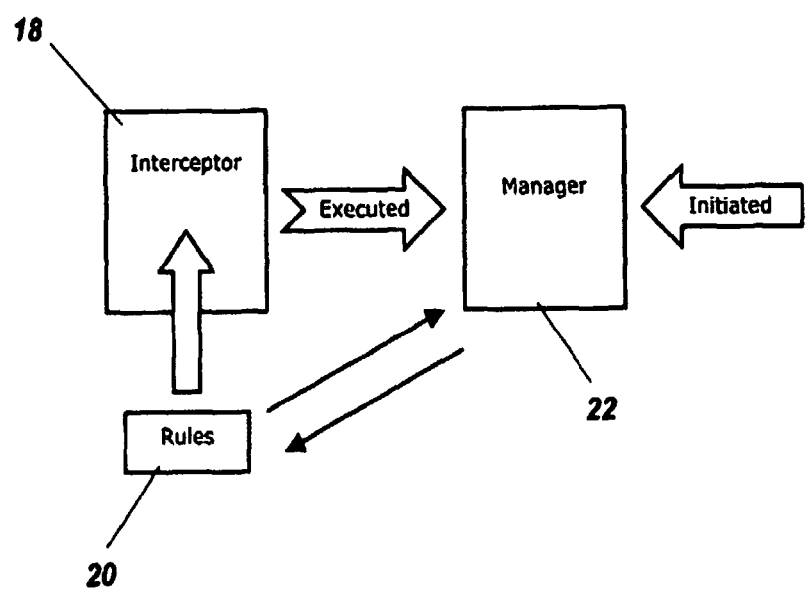
FIG. 2 is a process diagram illustrating an action of the preferred method according to the present invention.

FIG. 2 illustrates the interface of the manager program 22 with the rules database 20 and the system user.

When the interceptor program 18 detects that the application 12 is attempting to write to the hard drive 16 it initiates the loading and execution of the manager program 22. The latter interrogates the rules database 20 to determine the access level of the application 12 and controls the interceptor program 18 to allow or prevent the write action in dependence on the relevant rule in the rules database 20. If the application 12 is not listed in the rules database 20 or the particular write instruction is not allowed, the manager program 22 can generate a prompt signal to be displayed on the computer screen, requiring the user to make a decision on whether or not to allow the write instruction. This prompt can have a number of responses for the user to choose, such as "Allow write access", "Block write access" and "Allow write access to this file type only". Having chosen the response the user can also select one of a number of further actions as follows.

1 Store the response in the rules database—The response is stored in the rules database as a further rule to be applied to that application on all future write actions.
2 Block once the write action—This prevents the requested write action for this occasion only and further write attempts by the application again result in a user prompt.
3 Allow once the write action—This allows the requested write action but any future write requests for the application again result in a user prompt.

Thus, for example, if the application 12 is attempting to write a file to the hard drive 16 with a particular file extension, the rules database 20 can be updated such that all future attempts by the application 12 to write files of that same extension to the hard drive 16 would be automatically allowed or prevented or result in further user prompts.

The privilege to write to the hard drive is distinct from the privilege to write to a directory. The former can be independent of the latter, that is, an application can have the privilege to write to the hard drive, independently of what directory the write is to occur in. As a result, the rules database comprising privilege levels can contain a privilege entry associated with an application whose value is independent of the directory the application is seeking to write to.

Practitioners of ordinary skill will recognize that in some operating systems, including Windows™, file extensions can be arbitrarily applied to a file while the file contents are in fact something else. This common trick is used by virus writers to distribute an executable payload with an extension other then .exe (in the Windows case). Thus, users can be tricked into clicking on (in order to view) what appears to be a non-executable (a .jpg extension for a JPEG image, for example), but the computer, recognizing that internally, the file is an executable, will pass control to the program and launch it—thus propagating the virus. Therefore, where determining the "file extension" is referred to in this disclosure, it also includes detecting the actual type of file by examination of its contents, especially in the case where internally such file is an executable. Reference is made to Windows XP in a Nutshell, Second Edition, © 2005, O'Reilly Media, U.S.A. Reference is made to Microsoft Windows Internals, 4th Edition: Microsoft Windows Server 2003, Windows XP, and Windows 2000, Mark E. Russinovich, David A. Solomon, Microsoft Press, Hardcover, 4th edition, Published December 2004, 935 pages, ISBN 0735619174.

The manager program 22 can also be loaded and executed by the user at start up of the computer or at any time in order to scan the hard drive 16 for programs to build a full rules database 20. The manager program 22 can also be prompted by the user to display a list of programs within the rules database 20 with the access level of each program, giving the user the option to delete, add or modify each entry. In addition, a rules database can be pre-created, or incrementally improved and distributed to the computer electronically, either embodied on a disk or electronically over a data network. Rules determined by users can also be uploaded to a central depository as well. Rule updates can be downloaded into the computer. Rules can also be included with installation files for the particular application that the installation file is creating. In this case, the installation process has to be sufficiently certified that program installation does not corrupt the database by incorporating bogus rules that service virus writers. Certification can include digital signing protocols between the invention and the installing program and other modes of verifying authenticity, including remotely accessed keys or trusted third parties accessed over a network. Rules can also be derived by examining operating system data where such data presents correspondences between installed program applications and file types and extensions. In this case, other authentication may be necessary in order to avoid virus writers from inserting bogus file type associations within the operating system databases. Practitioners of ordinary skill will recognize that authentication can include cyclic redundancy checking (CRC) and other types of numerical algorithms that detect when tampering has occurred.

Figure 3:
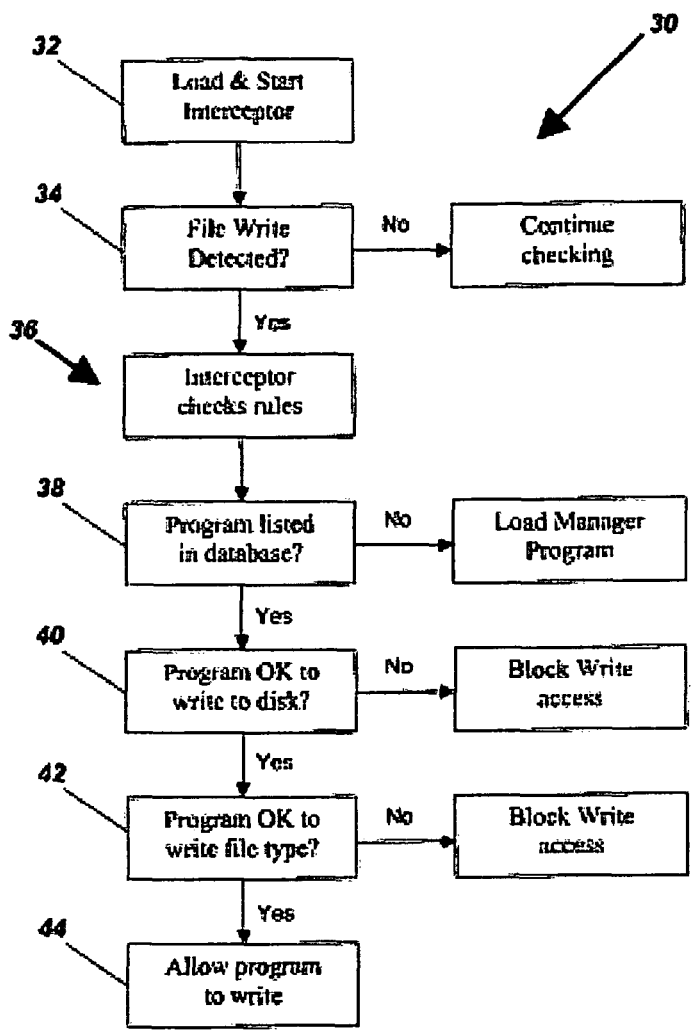
FIG. 3 is a flow diagram of the preferred method.

In FIG. 3 a flow diagram 30 is shown which illustrates the method followed on initiation 32 of the interceptor program 18. In the preferred embodiment, the interceptor module is a kernel mode driver which has a higher level of access to the Windows file system and system resources. Once initiated the interceptor program 18 waits in a monitoring step 34 during which it monitors for any file write operation to the hard drive 16. In the absence of a file write operation, the interceptor program 18 remains in the monitoring step 34 and continues to check for a file write operation.

If a file write operation is detected then write is pended in a queue and the interceptor program 18 proceeds to complete a series of rule checking steps 36 by calling a kernel mode rules checker. Initially the rules checker checks if the application 12 making the write attempt is listed in the rules database 20. The rules database can be stored on the local personal computer, client computer or remote server. In the preferred embodiment, a recent list of rules that have been interrogated may also be held in a cache in kernel memory cache which speeds up applications that are frequently accessing the drive. If the application 12 is not listed then the interceptor program 18 initiates the manager program 22 to allow the user to make a decision about the correct way in which to proceed. Otherwise, if the application 12 is listed then the interceptor program 18 proceeds to the next rule checking step.

On finding the application 12 listed in the rules database 20, the interceptor program 18 goes on to check if the write privileges of the application 12. Initially the hard drive write privilege of the application 12 is checked. If the application 12 does not have privilege to write to the hard drive then write access is blocked. Otherwise, the interceptor program 18 checks if the application 12 has write privilege for the specific file type, directory or filename which the write attempt has been made to. The manager program can, at this step, check the data to be written or the file to which such data is being appended to determine if the contents of the file are the appropriate file type, that is, to avoid improper creation of portable executable (PE) or other files whose contents are intended to be used as computer program code. PE files are files that are portable across all Microsoft 32-bit operating systems. The same PE-format file can be executed on any version of Windows 95, 98, Me, NT, and 2000. This is supplemental to checking the file extension in order to avoid the virus propagation technique described above. If the application 12 does have privilege to write to the specific detected file type or file extension then the write operation is allowed. Otherwise write access is blocked. A signature of the application, which is a number that is calculated to determine whether a code block has been tampered with, is also stored in the rules database. Practitioners of ordinary skill will recognize that CRC, or cyclic redundancy checks or other types of signature checking, for example, MD5 may be used. Reference is made to "Applied Cryptography" by Bruce Schneier, John Wiley & Sons, 1996, ISBN 0-471-11709-9. Practitioners of ordinary skill will recognize that these techniques can also be used to authenticate the rule database that the manager program uses to verify the permission of the application. This allows trusted programs to be allowed access to the drive if their signature/structure hasn't changed, that is, the program has determined that the there has not been tampering with the application. An example is that a trusted application could be infected with a Trojan or virus and still have access to the drive based on its earlier approval being registered in the database. The manager program can use a number of criteria for the drive access of an application. The rules can be based on file name, directory name, file type, file extension, registry access and creation of specific file types.

If no rules are found for an application then a prompt module can ask the user what access level or permission they wish to allow for the application. This can involve denying or blocking the application write for that instant or for ever. The user can also get information from other users responses to a specific application by data being downloaded from a central server over a data network, both a proprietary network as well as the Internet.

The system also allows feedback on the users responses to write requests to be uploaded and stored on a central server. This stores if the user allowed or denied the application write, or what level of permission was applied and if it was denied, the reason why. The reason the user denied it can be a number of responses such as 'virus', 'Trojan' etc. The applications name and signature are stored with the reason.

Although the present invention has been described and illustrated in detail, it is to be clearly understood that the same is by way of illustration and example only, and is not to be taken by way of limitation. It is appreciated that various features of the invention which are, for clarity, described in the context of separate embodiments may also be provided in combination in a single embodiment. Conversely, various features of the invention which are, for brevity, described in the context of a single embodiment may also be provided separately or in any suitable combination. It is appreciated that the particular embodiment described in the Appendices is intended only to provide an extremely detailed disclosure of the present invention and is not intended to be limiting. It is appreciated that any of the software components of the present invention may, if desired, be implemented in ROM (read-only memory) form. The software components may, generally, be implemented in hardware, if desired, using conventional techniques.

The spirit and scope of the present invention are to be limited only by the terms of the appended claims.

What is claimed:

1. A method of controlling write access to a mass data storage device by:
    running a first process that operates in conjunction with an operating system that manages access to a data storage device, said process operating in kernel mode monitoring data storage device accesses; detecting by use of the process an attempt by an application distinct from the first process to write data to said data storage device;
    in response to such detection, interrogating a rules database wherein said rules database is comprised of a plurality of references to a corresponding plurality of applications, each reference further comprised of at least one access level associated with the corresponding application; and
    controlling write access to the data storage device by the application attempting the write in dependence on a result of said interrogation; wherein said interrogation result is comprised of the value of the access level associated with said application.

2. A method as claimed in claim 1 in which the access level is one of a plurality of levels, the levels including a first level in which no write access is allowed, a second level in which full write access is allowed, and a third level in which write access is only allowed to write data of at least one specified file type.

3. A method as claimed in claim 2 where in a case where the access level is controlled to the first level, the method further includes generating a prompt on a display requesting response from a user, receiving such response, and updating the database in dependence on such response.

4. A method as claimed in claim 3 in which the user can respond to the prompt by choosing from of a number of possible responses, the possible responses comprised of a first response for allowing write access, a second response for blocking write access and a third response for allowing write access for a specific file type.

5. A method as claimed in claim 4 in which the user can respond further by selecting from a plurality of further actions, the further actions comprised of: storing the chosen response in the rules database.

6. The method according to claim 1 with the additional steps of determining whether a rule corresponding to said application is in the database, in response to determining that no such rule resides in the database, transmitting a query to a remote server operatively connected to the computer over a data network and receiving into said computer from the remote server at least one rule corresponding to said application.

7. The method of claim 6
    further comprising: determining that the received rule has not been tampered with.

8. The method of claim 1 where at least one rule is produced by means of inspection of a database that relates at least one application to one file type associated with data said application writes to a mass data storage device.

9. The method of any of claim 1 or 2 through claim 8 where the detecting step further comprises determining a file type that said data comprises by means of inspection of the data itself.

10. The method of claim 1 further comprising generating a prompt on a display requesting a response from a user, receiving from the user a response and where the user response is automatically encoded and uploaded over a data network to a remote stored database.

11. The method of any of claim 1 further comprising: determining that the database does not contain rules that have been tampered with.

12. The method of claim 1 further comprising pending the write request into a queue and processing the contents in the queue in the order in which permission values are obtained.

13. The method of claim 1 further comprising determining whether the application code has been tampered with.

14. The method of claim 13 further comprising
blocking write access to the data storage device by the application if the application has been determined to be tampered with, where such blocking occurs even if the rule associated with the application would normally permit the write access.

15. A computer readable hardware device containing digital data that, when loaded into a computer and executed as a program, causes the computer to execute the method of claim 1.

16. In a computer comprising a mass data storage device and an application running on said computer in conjunction with an operating system that manages access to said data storage device, a method of controlling write access to said data storage device by said application comprising:
detecting using a process operating in kernel mode monitoring file system access an attempt by the application to write data of a designated file type to said data storage device;
in response to said attempt, retrieving a permission value from a database comprised of data elements encoding at least one permission value associated with the application; and
controlling write access to the data storage device by the application in dependence on said permission value.

17. The method of claim 16 further comprising:
inspecting the data to determine if the data is of a type consistent with the designated file type; and
further controlling write access to the data storage device by the application in dependence on the result of the inspection step.

18. The method of claim 17 with the additional step of receiving into said computer at least one datum that relates a name of the application to at least one associated file type that has a permission value for the application to write said file type.

19. The method of claim 17 where the permission value is independent of a directory in the file structure on the data storage device where the application is attempting to write.

20. The method of claim 17 further comprising prompting a user to input what permission value should apply to the attempted write access to the data storage device.

21. The method of claim 17 wherein the permission value encodes one of a plurality of levels, the levels comprised of a first level in which no write access is allowed, a second level in which full write access is allowed, and a third level in which write access is only allowed for at least one of a specified file type.

22. The method of claim 17 where the permission values are stored in a database that pre-exists the installation of an application on the computer that executes the method.

23. The method of claim 17 where write access is denied if no permission value corresponding to the application is found in the database.

24. The method of claim 17 where the controlling step blocks write access if the data is a portable executable file.

25. The method of claim 17 further comprising the step of automatically uploading the at least one permission value from said computer to an additional computer over a data communications network.

26. The method of claim 17 further comprising the step of:
in response to a determining that there is no locally stored permission value for the application, downloading from an additional computer over a data communications network at least one permission value that is added to the database.

27. The method of claim 17 further comprising:
receiving a rule from a database stored on a remote server operatively connected to said computer by means of a data communication network in response to a query from said computer automatically generated as a result of a determination that said computer does not have such a rule for an application.

28. The method of claim 16 where the permission value is independent of a directory where the application is attempting to write.

29. The method of claim 16 further comprising prompting a user to input what permission value should apply to the attempted write access.

30. The method of claim 16 in wherein the permission value encodes one of a plurality of levels, the levels comprised of a first level in which no write access is allowed, a second level in which full write access is allowed, and a third level in which write access is only allowed to write data of at least one of a specified file type.

31. The method of claim 16 where the permission values are stored in a data structure that pre-exists the installation of the running application on the computer that executes the method.

32. The method of claim 16 where write access is denied if no permission value corresponding to the application is found in the database.

33. The method of claim 16 with the further step of generating a prompt on a user interface on said computer requesting response from a user, accepting such response, and using such response to generate a permission value, and updating the database so that future attempt by such application shall be treated in accordance with the generated permission value.

34. The method of claim 33 where the user can respond to the prompt by choosing from a number of possible responses, the possible responses comprising a first response for allowing write access, a second response for blocking write access and a third response for allowing write access of a specific file type.

35. The method of claim 33 in which the user can respond further by selecting from a plurality of further actions, the further actions comprised of: storing the chosen response in the rules database.

36. The method of claim 16 with the additional step of: in response to determining that no such permission value resides in the database, transmitting a request for the permission value to a remote computer operatively connected to the computer by means of a data network and receiving into said computer at least one additional permission value and storing said at least one additional permission value entry into the database stored on said computer.

37. The method of claim 16 where the controlling step blocks write access if the data is a portable executable file.

38. The method of claim 16 further comprising the step of automatically uploading at least one permission value associated with said application from said computer to an additional computer over a data communications network.

39. The method of claim 16 further comprising the step of in response to determining that a required permission value is not present in the database, downloading from an additional computer over a data communications network at least one permission value that is added to the database.

40. The method of claim 16 where the database is stored on a remote server operatively connected to said computer by means of a data communication network.

41. A system for controlling write access to a first mass data storage device by at least one application running on a first computer system operatively connected to said first data storage device comprising:
   A first rules database stored on the first computer system comprised of at least
   one application identifier and at least one corresponding permission value; and
   An interceptor module operating as a kernel mode process monitoring file system access on the first computer system that monitors the at least one application operating distinct from the interceptor process, where upon a write access attempt to the first mass data storage device by the at least one running application, the interceptor module controlling the write access in dependency on a permission value corresponding to the at least one application attempting the write access, where the permission value is independent of the destination directory of the attempted write.

42. The system of claim 41 further comprising a manager module operating on the first computer system that manages the contents of the first rule database.

43. The system of claim 42 where the manager module operating on the first computer system is operatively connected over one or more computer networks to a second rule database stored on a second computer system comprised of at least one application identifier and at least one corresponding permission value where the manager module is enabled to automatically update the contents of the second rule database incrementally by transmitting data over a data network from the first rule database.

44. The system of claim 43 where the second rule database stored on a second computer system is operatively connected over one or more computer networks to a corresponding plurality of manager modules operating on a plurality of corresponding computer systems.

45. The system of claim 42 further comprising an input and output interface module that enables a user of the first computer system to modify the first rule database.

46. The system of claim 43 further comprising an input and output interface module that enables a user of the first computer system to modify the second rule database by inputting a permission value into the first computer and the first computer automatically transmitting that value to the second rule database.

47. The system of claim 43 where the second rule database is further comprised of permission values that, when operated on by the interceptor module cause the interceptor to perform at least one of the operations: allow write access, block write access, allow write access of a specified file type.

48. The system of claim 43 where the specified file type is an executable file type and the corresponding permission value denies access to the data storage device to write an executable file.

49. The system of claim 43 where the second database is further comprised of at least one signature value corresponding to the at least one application identifier.

50. The system of claim 43 where the second database is further comprised of at least one file type value corresponding to the at least one application identifier.

51. The system of claim 41 where the first rule database is encrypted.

52. The system of claim 41 where the first rule database is further comprised of permission values that, when operated on by the interceptor module cause the interceptor to perform at least one of the operations: allow write access, block write access, allow write access to a specified file type.

53. The system of claim 52 where the specified file type is an executable file type and the corresponding permission value denies write access to the data storage device to store the executable file type.

54. The system of claim 41 where the first database is further comprised of at least one signature value corresponding to the at least one application identifier.

55. The system of claim 41 where the first database is further comprised of at least one file type value corresponding to the at least one application identifier.

56. A system for maintaining from a central server a plurality of remote rule databases running on a plurality of corresponding remote computers operatively connected by a data communication network to the central server, each remote rule database comprised of at least one permission value designating permission to write to a mass data storage device associated with at least one application comprising:
   A central rule database residing on the central server, said central rule database comprised of at least one data element, said element comprised of at least two entries, the first being an application identifier and the second at least one permission value associated with said application designating permission to write to a mass data storage device;
   A module that receives from the plurality of remote computers requests for permission values corresponding to application identifiers, said request being comprised of at least one application identifier, where the owners of at least two of the plurality of remote computers are different; and
   A module that transmits the requested permission values retrieved from the central rule database to the requesting remote computers in order to cause a process operating on the requesting remote computer in kernel mode that monitors file system access to permit or deny access based on the transmitted permission values.

57. The system of claim 56 where the plurality of remote rule databases are encrypted.

58. The system of claim 56 where the at least one data element is further comprised of at least one signature associated with the at least one application.

* * * * *